United States Patent
Plummer

(10) Patent No.: US 7,788,655 B2
(45) Date of Patent: Aug. 31, 2010

(54) MECHANISM FOR ORDERING LISTS OF LOCAL VARIABLES ASSOCIATED WITH A PLURALITY OF CODE BLOCKS

(75) Inventor: Christopher J. Plummer, San Martin, CA (US)

(73) Assignee: Oracle America, Inc., Redwood City, CA (US)

( * ) Notice: Subject to any disclaimer, the term of this patent is extended or adjusted under 35 U.S.C. 154(b) by 1401 days.

(21) Appl. No.: 11/216,753

(22) Filed: Aug. 30, 2005

(65) Prior Publication Data

US 2006/0048105 A1    Mar. 2, 2006

Related U.S. Application Data

(60) Provisional application No. 60/606,169, filed on Aug. 30, 2004.

(51) Int. Cl.
*G06F 9/45* (2006.01)
(52) U.S. Cl. ........................ 717/152; 717/154
(58) Field of Classification Search ........................ None
See application file for complete search history.

(56) References Cited

U.S. PATENT DOCUMENTS 5,530,866 A * 6/1996 Koblenz et al. ............. 717/144
6,075,942 A * 6/2000 Cartwright, Jr. ............. 717/138

2003/0079210 A1 * 4/2003 Markstein et al. ........... 717/152

FOREIGN PATENT DOCUMENTS

WO   WO 2006/026681 A3   3/2006

OTHER PUBLICATIONS

Aho, Sethi, and Ullman, "Compilers: Principles, Techniques, and Tools", 1986, Addison-Wesley, Chapter 9, ISBN 0-201-10088-6.*
Yang et al., "LaTTe: A Java VM Just-in-Time Compiler with Fast and Efficient Register Allocation".*
Lowry and Medlock, "Object Code Optimization", Jan. 1969, Communications of the ACM, vol. 12, No. 1.*
Byung-Sun Yang; Soo-Mook Moon; Seongbae Park; Junpyo Lee; Seungll Lee; Jinpyo Park; Chung, Y.C.; Suhyun Kim; Ebcioglu, K.; Altman, E., "LaTTe: a Java VM just-in-time compiler with fast and efficient register allocation," Parallel Architectures and Compilation Techniques, 1999. Proceedings. 1999 International Conference on , vol., No., pp. 128-13.*

(Continued)

*Primary Examiner*—James Rutten
(74) *Attorney, Agent, or Firm*—Osha • Liang LLP

(57) ABSTRACT

A compilation mechanism is disclosed for facilitating the keeping of local variables in the same hardware registers across multiple code blocks. In one implementation, each code block has a list of local variables associated therewith. This list of local variables represents the local variables that should be loaded into registers prior to entering a code block. For multiple code blocks, the various lists may have local variables in common. In one implementation, the mechanism orders the local variables in the various lists in such a manner that, as much as possible, the same local variables are placed in the same slots of the various lists. By doing so, the mechanism minimizes the movement of local variables from register to register when going from code block to code block.

12 Claims, 12 Drawing Sheets

| CODE BLOCK | SUCCESSOR BLOCK | REFERENCED LOCALS | ASSIGNED LOCALS |
|---|---|---|---|
| L0 | L1 | NONE | x, y, i |
| L2 | L3 | y | NONE |
| L3 | L1 | x, i | NONE |
| L1 | L2 | i | NONE |

OTHER PUBLICATIONS

Byung-Sun Yang; Junpyo Lee; Seungll Lee; Seongbae Park; Yoo C. Chung; Suhyun Kim; Kemal Ebcioglu; Erik Altman; Soo-Mook Moon, "Efficient Register Mapping and Allocation in LaTTe, an Open-Source Java Just-in-Time Compiler," Parallel and Distributed Systems, IEEE Transactions on, vol. 18, No. 1, pp. 57-69, Jan. 2007.*

Poletto, M. and Sarkar, V. 1999. Linear scan register allocation. ACM Trans. Program. Lang. Syst. 21, 5 (Sep. 1999), 895-913. DOI= http://doi.acm.org/10.1145/330249.330250.*

International Preliminary Report, application No. PCT/US2005/031010 dated Nov. 22, 2007, 5 pages (Written Opinion inclusive).

* cited by examiner

L0:  x = 1        ~302 y = 1        ~304 i = 1        ~306 go to line 318        ~308

L2:  y + +        ~310 if (y & 1 = = 1)        ~312 y + +        ~313

L3:  x + +        ~314 i + +        ~316

L1:  if (i < 100) go to line 310   ~318

*Fig. 3*

| CODE BLOCK | SUCCESSOR BLOCK | REFERENCED LOCALS | ASSIGNED LOCALS |
|---|---|---|---|
| L0 | L1 | NONE | x, y, i |
| L2 | L3 | y | NONE |
| L3 | L1 | x, i | NONE |
| L1 | L2 | i | NONE |

| CODE BLOCK | SUCCESSOR BLOCK | REFERENCED LOCALS | ASSIGNED LOCALS |
|---|---|---|---|
| L0 | L1 | NONE | x, y, i |
| L2 | L3 | y | NONE |
| L3 | L1 | x, i | NONE |
| L1 | L2 | i, y | NONE |

Fig. 7A

| CODE BLOCK | SUCCESSOR BLOCK | REFERENCED LOCALS | ASSIGNED LOCALS |
|---|---|---|---|
| L0 | L1 | NONE | x, y, i |
| L2 | L3 | y | NONE |
| L3 | L1 | x, i, y | NONE |
| L1 | L2 | i, y | NONE |

Fig. 7B

| CODE BLOCK | SUCCESSOR BLOCK | REFERENCED LOCALS | ASSIGNED LOCALS |
|---|---|---|---|
| L0 | L1 | NONE | x, y, i |
| L2 | L3 | y, x, i | NONE |
| L3 | L1 | x, i, y | NONE |
| L1 | L2 | i, y | NONE |

Fig. 7C

| CODE BLOCK | SUCCESSOR BLOCK | REFERENCED LOCALS | ASSIGNED LOCALS |
|---|---|---|---|
| L0 | L1 | NONE | x, y, i |
| L2 | L3 | y, x, i | NONE |
| L3 | L1 | x, i, y | NONE |
| L1 | L2 | i, y, x | NONE |

Fig. 7D

| CODE BLOCK | SUCCESSOR BLOCK | REFERENCED LOCALS |
|---|---|---|
| L0 | L1 | NONE |
| L2 | L3 | y(u), x(u), i(u) |
| L3 | L1 | x(u), i(u), y(u) |
| L1 | L2 | i(u), y(u), x(u) |

*Fig. 9A*

| CODE BLOCK | SUCCESSOR BLOCK | REFERENCED LOCALS |
|---|---|---|
| L0 | L1 | NONE |
| L2 | L3 | i(o), y(o), x(o) |
| L3 | L1 | x(u), i(u), y(u) |
| L1 | L2 | i(o), y(o), x(o) |

*Fig. 9B*

| CODE BLOCK | SUCCESSOR BLOCK | REFERENCED LOCALS |
|---|---|---|
| L0 | L1 | NONE |
| L2 | L3 | i(o), y(o), x(o) |
| L3 | L1 | i(o), y(o), x(o) |
| L1 | L2 | i(o), y(o), x(o) |

*Fig. 9C*

| CODE BLOCK | SUCCESSOR BLOCK | REFERENCED LOCALS |
|---|---|---|
| L0 | L1 | NONE |
| L2 | L3 | w(u), x(u) |
| L3 | L4 | y(u), w(u) |
| L4 | L1 | y(u), x(u) |
| L1 | L2 | w(u), z(u) |

*Fig. 10A*

| CODE BLOCK | SUCCESSOR BLOCK | REFERENCED LOCALS |
|---|---|---|
| L0 | L1 | NONE |
| L2 | L3 | w(o), x(u) |
| L3 | L4 | y(u), w(u) |
| L4 | L1 | y(u), x(u) |
| L1 | L2 | w(o), z(u) |

*Fig. 10B*

| CODE BLOCK | SUCCESSOR BLOCK | REFERENCED LOCALS |
|---|---|---|
| L0 | L1 | NONE |
| L2 | L3 | w(o), x(u) |
| L3 | L4 | y(o), w(u) |
| L4 | L1 | y(o), x(u) |
| L1 | L2 | w(o), z(u) |

*Fig. 10C*

| CODE BLOCK | SUCCESSOR BLOCK | REFERENCED LOCALS |
|---|---|---|
| L0 | L1 | NONE |
| L2 | L3 | w(o), x(u) |
| L3 | L4 | y(u), w(u) |
| L4 | L1 | y(u), x(u) |
| L1 | L2 | w(o), z(u) |

*Fig. 11A*

| CODE BLOCK | SUCCESSOR BLOCK | REFERENCED LOCALS |
|---|---|---|
| L0 | L1 | NONE |
| L2 | L3 | w(o), x(u) |
| L3 | L4 | w(u), y(o) |
| L4 | L1 | x(u), y(o) |
| L1 | L2 | w(o), z(u) |

*Fig. 11B*

| CODE BLOCK | SUCCESSOR BLOCK | REFERENCED LOCALS |
|---|---|---|
| L0 | L1 | NONE |
| L2 | L3 | w(o), x(u) |
| L3 | L4 | w(o), y(o) |
| L4 | L1 | x(u), y(o) |
| L1 | L2 | w(o), z(u) |

*Fig. 11C*

MECHANISM FOR ORDERING LISTS OF LOCAL VARIABLES ASSOCIATED WITH A PLURALITY OF CODE BLOCKS

REFERENCE TO OTHER APPLICATIONS

This application claims the benefit of U.S. provisional application Ser. No. 60/606,169, filed on Aug. 30, 2004. The entire contents of the provisional application are incorporated herein by this reference.

BACKGROUND

Many computer programs have been written in the Java programming language. If a program is written in Java, it can be run on any machine on which a Java virtual machine (JVM) is executing. This is so regardless of the hardware used in the machine, and regardless of the operating system executing on the machine. Thus, a Java program is hardware and operating system independent.

Java is an object oriented programming language. Thus, a Java program comprises a plurality of object classes, and each object class can have zero or more methods. When a Java program is executed, the methods of the object classes are invoked and executed.

A java method may be executed in one of two ways. One way is for the JVM to execute the method interpretively. More specifically, before a Java program is executed, the source code of the program (and hence, the source code of the methods) is broken down into Java bytecodes. At runtime, the Java interpreter of the JVM takes the bytecodes of a method and interprets them. In effect, the interpreter executes the bytecodes to give the method effect. Executing the method in this way is effective, but because the execution is carried out in an interpretive manner, it is relatively slow.

As an alternative, the JVM may choose not to interpret a method, but rather compile the bytecodes of the method down into native code. The JVM then causes the native code to be executed directly by the processor(s) of the machine. By doing this, the JVM causes subsequent execution of the method to be performed much faster (since it is now executed natively rather than interpretively). Often, the JVM decides to compile a method after the method has been invoked several times. To perform the compilation, the JVM invokes a dynamic compiler known as a JIT (just-in-time) compiler, which is part of the JVM. The JIT compiler is dynamic in that, unlike other compilers, it performs the method compilation at runtime.

Like any other compiler, it is a goal of the JIT compiler to produce native code that executes in an optimized manner. One way to optimize the execution of native code is to structure the code in such a way that often-used local variables are maintained in hardware registers as much as possible. Doing so reduces the need to load the local variables from memory, which is a time consuming process. The approach traditional compilers have taken to keep local variables in registers is to perform a global analysis of a method and to compute scores for each local variable for certain sections of the method. The scores reflect how important it is to keep a local variable in a register for a certain section of the method. Based on the scores, the traditional compilers allocate registers to certain local variables. Once allocated, the registers are dedicated to the local variables over a specific section of the method (i.e. over a specific section of the method's code).

While this approach is effective for keeping local variables in dedicated registers, it has a significant drawback in that it is relatively heavyweight. Since the JIT compiler compiles methods during runtime, using such a heavyweight process to compile methods would significantly slow down program execution. This slowdown, in turn, might outweigh any benefits gained from the resultant optimized code. Also, the code required to implement the traditional approach is relatively heavyweight, and the memory that it consumes during execution is large. In many implementations, the JIT compiler is used in an embedded device with limited resources. In such implementations, the traditional approach just cannot be used due to resource constraints. Thus, for at least the above reasons, the JIT compiler cannot practically use the traditional approach for keeping local variables in registers.

SUMMARY

In accordance with one embodiment of the present invention, there is provided an improved mechanism for keeping local variables in registers. Unlike the traditional approach, this mechanism does not perform a global analysis of a method and then dedicate one or more registers to local variables over particular sections of the method. Rather, the mechanism separates a method into a plurality of code blocks, and then tries to flow the local variables referenced in the various code blocks to other code blocks in the method. In a sense, the local variables are "merged". After this flowing process, each code block has a list of local variables. This list of local variables represents the local variables that should be loaded into hardware registers prior to executing that code block. Because of the flowing process, the list associated with a code block may include local variables that were flowed in from other code blocks that are not actually referenced in that code block. A practical consequence of the flowing process is that some continuity of local variables is established between the code blocks. Because the lists of local variables of the code blocks will have many local variables in common (this is a result of the flowing or merging process), many of the same local variables will already be loaded into registers prior to executing code blocks. If a local variable is already in a register prior to loading, it does not need to be loaded. Thus, by establishing local variable continuity among the various code blocks, many local variables will already be in registers so that, in going from code block to code block, few if any local variables will need to be loaded into registers. In this manner, the mechanism helps to keep local variables in registers to avoid the loading process.

In one embodiment, in addition to keeping local variables in registers, the mechanism also sees to it that the local variables are kept in the same registers across multiple code blocks. That way, in going from code block to code block, a local variable that has been loaded into a register will not have to be moved from that register to another register. In one embodiment, this is achieved by properly ordering the local variables in the lists of local variables. More specifically, in one embodiment, which register a local variable is loaded into is determined, at least partially, by which slot in a list of local variables the local variable is situated. For example, if a code block has a list of local variables that includes x, y, and z, in that order, then x, y, and z may be loaded into registers r6, r7, and r8, respectively. If a subsequent code block has the same local variables but its list of local variables is in the order of y, z, x, then that code block would expect y, z, and x to be in registers r6, r7, and r8, respectively. Thus, if the first code block falls through or branches to the subsequent code block, x would be moved from register r6 to r8, y would be moved from r7 to r6, and z would be moved from r8 to r7. To avoid this inefficient movement of local variables from register to register, one embodiment of the mechanism orders the local variables in the various lists in such a manner that, as much as possible, the same local variables are placed in the same slots of the various lists. By doing so, the mechanism minimizes the movement of local variables from register to register when going from code block to code block.

BRIEF DESCRIPTION OF THE DRAWINGS

FIG. 3 shows a set of sample code.

FIGS. 7A-7D show how the lists of referenced locals shown in FIG. 5 may be merged, in accordance with one embodiment of the present invention.

FIGS. 9A-9C show how the lists of referenced locals shown in FIG. 7D may be ordered, in accordance with one embodiment of the present invention.

FIGS. 10A-10C show how a plurality of lists of referenced locals may be misordered if a less optimal slot is selected for a local.

FIGS. 11A-11C show how the plurality of lists of referenced locals shown in FIG. 10A may be more optimally ordered, in accordance with one embodiment of the present invention.

DETAILED DESCRIPTION OF EMBODIMENT(S)

System Overview

Figure 1:
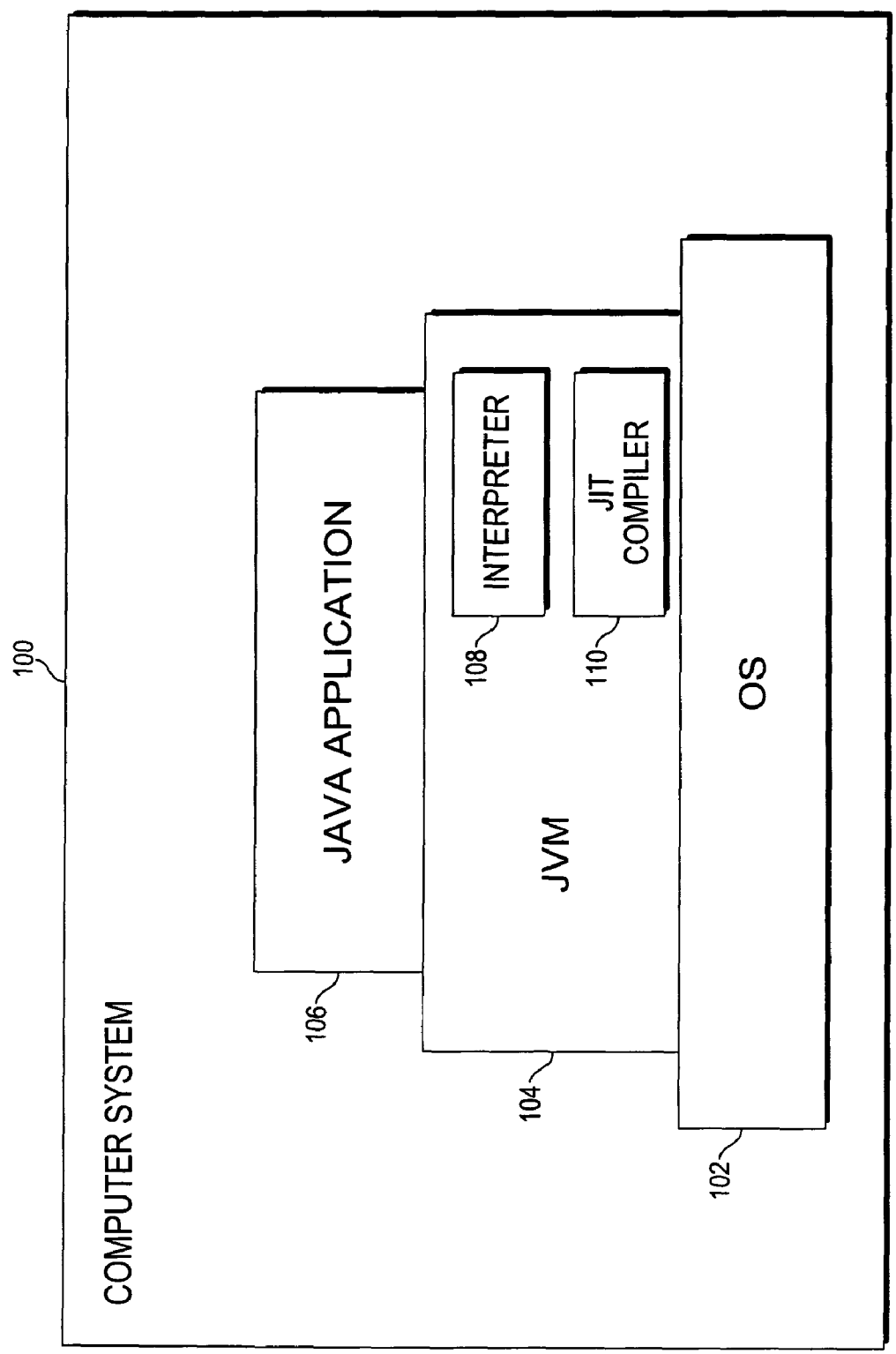
FIG. 1 shows a functional block diagram of a computer system in which one embodiment of the present invention may be implemented.

With reference to FIG. 1, there is shown a functional block diagram of a computer system 100 in which one embodiment of the present invention may be implemented. In the following discussion, an embodiment of the present invention will be described in the context of a Java JIT compiler. However, it should be noted that the invention is not so limited. Rather, the concepts taught herein may be applied generally to any type of compiler in which it is desirable to generate compiled or native code that keeps local variables in registers.

As shown in FIG. 1, the system 100 comprises an operating system 102, a JVM 104, and a Java application 106. For purposes of the present invention, operating system 102 may be any type of operating system, including but not limited to Solaris, Unix, Linux, Windows, DOS, and MacOs. Operating system 102 provides the low level functionalities relied upon by the other components in the system.

The JVM 104 executes on top of the operating system 102. A basic function of the JVM 104 is to provide the platform for supporting execution of the Java application 106. As noted previously, Java is an object oriented language; thus, a Java application 106 comprises a plurality of Java classes, with each class comprising zero or more methods. In executing the Java application 106, and hence, the methods of the Java classes, the JVM 104 may invoke the interpreter 108 and the JIT compiler 110. More specifically, to execute a method interpretively, the JVM 104 invokes the interpreter 108 to have the interpreter 108 interpret the bytecodes of the method. To execute the method natively, the JVM 104 invokes the JIT compiler 110 to have the compiler 110 compile the bytecodes of the method down to compiled or native code (code that the processor(s) (not shown) of the computer system 100 can execute directly), and then have the processor(s) execute the native code directly. The JVM 104 often causes a method to be compiled down to native code after that method has been invoked several times. In one embodiment, it is the JIT compiler 110 that implements the concepts taught herein.

JIT Compiler

Figure 2:
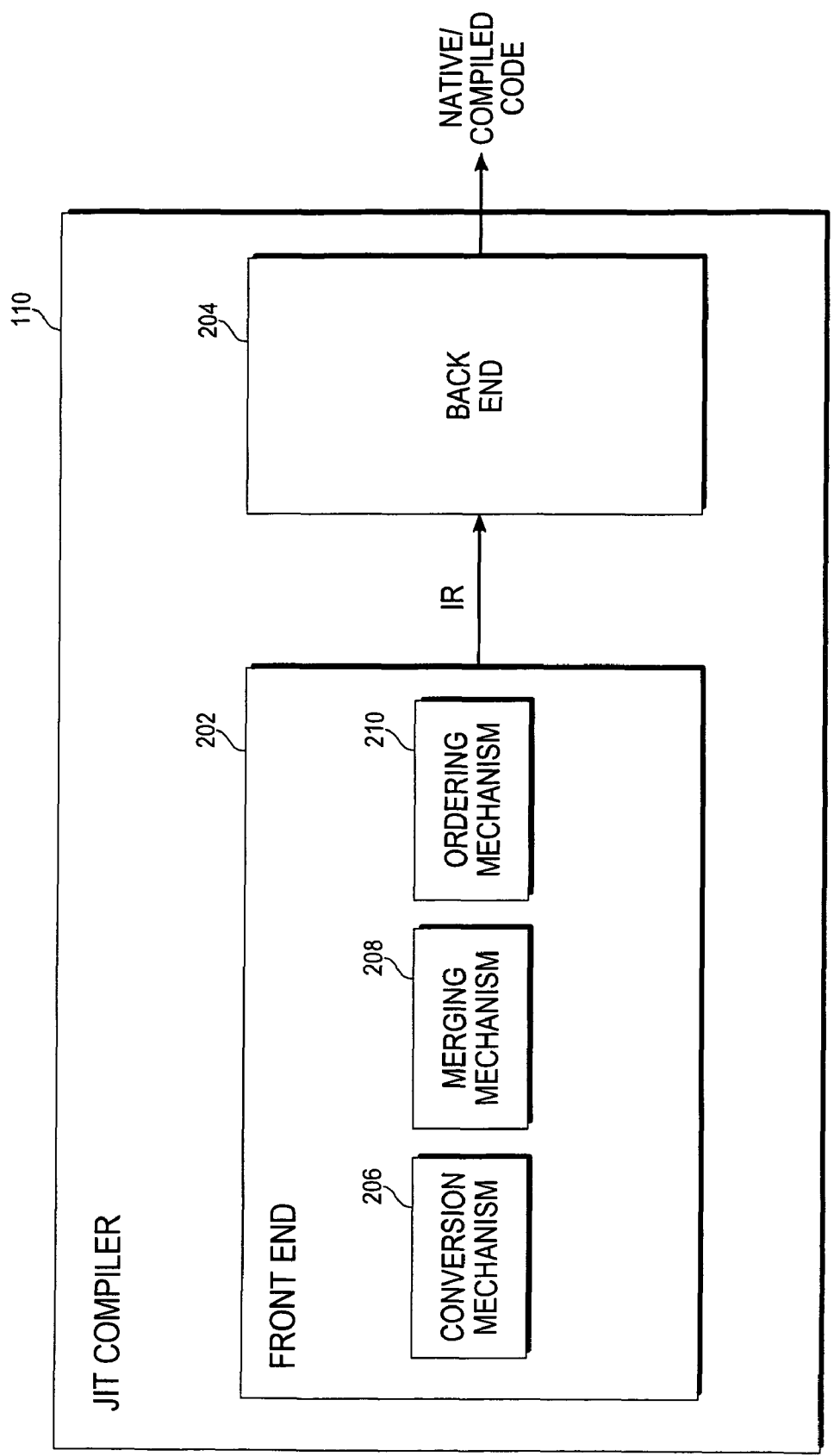
FIG. 2 is a functional block diagram that shows a compiler in greater detail, in accordance with one embodiment of the present invention.

An embodiment of the JIT compiler 110 is shown in more detail in FIG. 2. As shown, the JIT compiler 110 comprises a front end 202 and a back end 204. It is the responsibility of the front end 202 to convert the bytecodes of a method into an intermediate representation (IR). As part of this process, the front end 202 separates the bytecodes of the method into extended code blocks (hereinafter, code blocks), and generates an IR for the method based upon the code blocks. Using the IR provided by the front end 202, the back end 204 emits compiled or native code that implements the logic specified by the IR. In one embodiment, as part of the IR, the front end 202 provides, for each code block of the method, an associated list of local variables (hereinafter, locals). The list of locals associated with a code block represents the locals that should be loaded into hardware registers before executing that code block. Given this information, the back end 204 can emit native code that ensures that this is done. A point to note is that the lists of locals are suggestions provided to the back end 204. The back end 204 is not required to always load these locals into hardware registers prior to executing a code block and in fact, the back end 204 may choose not to. The lists of locals represent additional information that the back end 204 can use to make the native code more optimized.

Front End

As shown in FIG. 2, the front end 202 comprises a conversion mechanism 206, a merging mechanism 208, and an ordering mechanism 210. Each of these mechanisms will be described in detail below.

Conversion Mechanism

In one embodiment, the conversion mechanism 206 performs several functions. Initially, it separates the bytecodes of a method into a plurality of code blocks. A code block is a sequence of bytecodes in which flow control always enters at the beginning of the sequence (i.e. there are no branches into the middle of a code block). To do this separation, the conversion mechanism 206 processes each bytecode, starting with the first bytecode of the method, and looks for branches to other bytecodes. For each branch, the target of the branch is marked as the beginning of a code block. The very first bytecode of the method is also marked as the beginning of a code block. In addition, the beginning of each exception handler (if any) is marked as the beginning of a code block. The conversion mechanism 206 continues this process of looking for branches until all of the bytecodes have been processed. At the end of the process, all of the bytecodes will have been separated into code blocks. As the conversion mechanism 206 carries out the separation process, it follows the branches and hence the flow of the bytecodes. It labels each code block in flow order (the order in which they were marked). Thus, if there are branches, the order of the code block labels may be different from the order of the bytecodes.

To illustrate how a set of bytecodes may be separated into a plurality of code blocks, reference will be made to the example of FIG. 3, which shows the code for a loop. To best facilitate understanding, the code shown in FIG. 3 is not written in actual bytecodes (which are low level and more difficult to understand) but rather is written in pseudo code. The same concepts apply.

Initially, the conversion mechanism 206 marks the first line of code 302 of the method as the beginning of a code block. Thus, line 302 is marked as the beginning of code block L0. In line 308, there is a branch to line 318; thus, line 318 is marked as the beginning of the next code block L1. At line 318, there is a conditional branch back to line 310; thus, line 310 is marked as the beginning of the next code block L2. At line 312, there is a conditional branch. If the "if" condition is satisfied, fall through to line 313. If the "if" condition is not satisfied, then branch to line 314; thus, line 314 is marked as the beginning of the next code block L3. Finally, line 316 simply falls through to line 318, which has already been marked as the beginning of code block L1. Thus, it is not necessary to mark line 318 again. In this manner, the lines of code are separated into multiple code blocks. Notice that the code blocks are labeled in order of flow. For this reason, the numerical numbering of the code blocks does not coincide with the sequence of the lines of code.

After the code blocks are determined, the conversion mechanism 206 processes each code block and generates the IR for each code block. In one embodiment, the IR for a code block takes the form of a DAG (directed acyclic graph). The IR for a code block comprises a plurality of IR root nodes. Each root node represents a statement, which may be, for example, an assignment, a branch, a method invocation, etc. Under each IR root node is the one or more expression trees that make up the statement. Each expression tree captures, in tree form, the lower level components of the statement.

To illustrate how a statement may be converted, reference will be made to the following example. Suppose that a code block has the statement:

$x=y+1000$.

In terms of bytecodes, this statement would translate into:
iload y
ipush 1000
iadd
istore x.

Figures 4, 5:
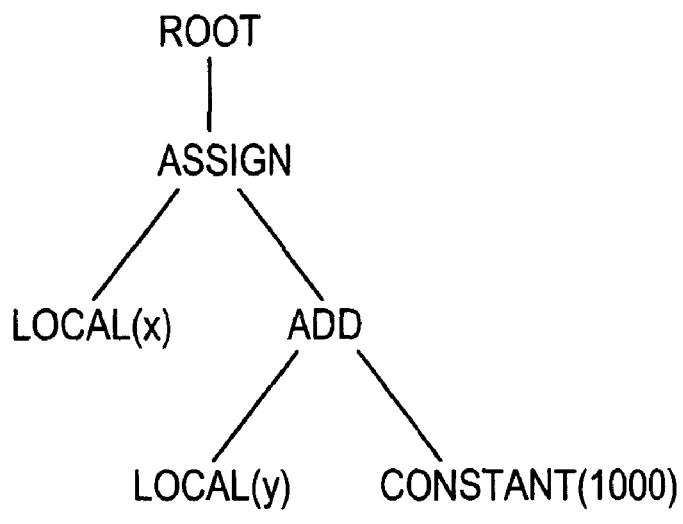
FIG. 4 shows a sample intermediate representation of an assignment statement.
FIG. 5 shows a table that embodies the results of generating a list of referenced locals and a list of assigned locals for each of the code blocks shown in FIG. 3, in accordance with one embodiment of the present invention.

This sequence of bytecodes would be converted into the IR tree shown in FIG. 4. As shown, the tree has a root node. Under the root node is an assign node, since this is an assignment operation. Under the assign node are the node for local x and an Add node. The fact that the node for local x is on the left means that the result of the add operation will be assigned to x. Under the Add node are the node for local y and the node for constant 1000. This indicates that the current value for local y is to be added to the constant 1000. Thus, overall, this tree structure indicates that 1000 should be added to local y, and the result should be assigned to local x.

The conversion mechanism 206 generates the IR for each code block. At the end of this process, a list of root IR nodes hangs off of each code block, representing the logic for that code block. The code blocks are also linked. Given this information, the back end 204 can go over each code block, iterate over the root nodes of that code block, and emit native code to implement the logic indicated by the expression trees under each root node.

In one embodiment, as part of generating the IR for each code block, the conversion mechanism 204 gathers some additional information for each code block. In one embodiment, the additional information includes: (1) a list of locals referenced by each code block; (2) a list of assigned locals to which values are assigned in each code block; and (3) a list of successor code blocks for each code block. A successor code block is a subsequent code block that a current code block branches or falls through to. For example, code block L1 of FIG. 3 branches to code block L2; thus, code block L2 is a successor code block to code block L1. Similarly, code block L3 is a successor code block to code block L2. It is possible for a code block to have multiple successor code blocks (e.g. a code block may contain a conditional branch that can branch to multiple code blocks). In one embodiment, this additional information is gathered by the conversion mechanism 206 in the course of generating the IR for a code block.

More specifically, the conversion mechanism 204 selects one of the code blocks to process. As the conversion mechanism 204 processes each bytecode in that code block, it determines whether that bytecode assigns a value to a local. If so, the conversion mechanism 204 adds that local to the list of assigned locals associated with the code block. Thus, for example, if the bytecode is "istore x" (which assigns a value to local x), then x is added to the list of assigned locals for that code block.

If the bytecode does not assign a value to a local, the conversion mechanism 204 determines whether the bytecode references a local. A local is referenced if the bytecode requires that the current value of that local be loaded into a register from memory. For example, the bytecode "iload y" references the local y. If a local is referenced by a bytecode, then that local may be added to the list of locals referenced by the code block.

The default is to add each referenced local to the list of referenced locals. However, in one embodiment, there are certain conditions that might prevent a referenced local from being added to the referenced locals list. A first condition is whether the referenced local is already on the list of assigned locals. If it is, then the referenced local is not added to the list of referenced locals. The reason for this is that one of the motivations for gathering a list of referenced locals for a code block is to cause those referenced locals to be loaded into registers before that code block is executed. If a referenced local is already on the list of assigned locals, it means that a value has been assigned to that local by the code block. If a value has been assigned to the local by the code block, there is no point in preloading the local into a register prior to executing the code block because the preloaded value would be clobbered or overwritten by the assignment before it is ever referenced. Thus, if a referenced local is already on the assigned locals list, it is not added to the referenced locals list.

Another condition that might prevent a referenced local from being added to the referenced locals list is if a method invocation has been encountered in the code block. In one embodiment, if a method invocation has been encountered in the code block, then the referenced local is not added to the referenced locals list. This is because in one embodiment, whenever a method is invoked, all locals in registers are assumed to be lost. Thus, if a local is not referenced in a code block until after a method invocation has been encountered in the code block, there is no point in preloading that local into a register because the preloaded local would be lost before it is ever referenced. In one embodiment, the first time a method invocation is encountered in a code block, a "no more locals" flag is set. This flag indicates that no more referenced locals should be added to the referenced locals list for that code block.

Yet another condition that might prevent a referenced local from being added to the referenced locals list is if an instruction that can cause a garbage collection operation to be performed has been encountered in the code block. In Java, there are several bytecodes that, when executed, can cause a garbage collection operation to be performed. These include but are not limited to "new", "checkcast", and "instanceof". If a garbage collection operation is performed, all locals that store a pointer or a reference to an object are lost. These locals are referred to herein as pointer locals. In one embodiment, if a referenced local is a pointer local, and if an instruction that can cause a garbage collection operation to be performed has been encountered in the code block, then that local is not added to the referenced locals list. Since the pointer local may be lost as a result of the garbage collection operation, there is little point in preloading it into a register. In one embodiment, the first time an instruction that can cause a garbage collection operation to be performed is encountered in a code block, a "no more pointer locals" flag is set. This flag indicates that no more pointer locals should be added to the referenced locals list for that code block.

By processing each bytecode of a code block in the manner described above, the conversion mechanism 206 builds a list of assigned locals and a list of referenced locals for the code block. In addition to building these lists, the conversion mechanism 206 further builds a list of successor code blocks. This may done by following the flow of the bytecodes, and determining all of the code blocks to which the code block can branch or fall through. At the end of this process, the code block will have three associated lists: (1) a list of referenced locals (2) a list of assigned locals; and (3) a list of successor blocks. By applying this same process to all of the code blocks in a method, the conversion mechanism 206 derives the three lists for each of the code blocks in the method.

If the above process is applied to the sample method shown in FIG. 3, the results would be that shown in the table of FIG. 5. Specifically, code block L0 assigns values to three locals: x, y, and i. It references no locals, and it has one successor block, L1. Thus, as shown in the first row of the table, the code block L0 has L1 as the lone successor code block, has no referenced locals in the referenced locals list, and has x, y, and i in the assigned locals list. Code block L2 does not assign a value to any locals. It references just the local y, and it has one successor block, L3. Thus, as shown in the second row of the table, the code block L2 has L3 as the lone successor code block, has local y in the referenced locals list, and has no locals in the assigned locals list. Code block L3 does not assign a value to any locals. It references two locals, x and i, and it has one successor block, L1. Thus, as shown in the third row of the table, the code block L3 has L1 as the lone successor code block, has locals x and i in the referenced locals list, and no locals in the assigned locals list. Finally, code block L1 does not assign a value to any locals. It references just local i, and it has one successor block, L2. Thus, as shown in the fourth row of the table, the code block L1 has L2 as the lone successor code block, has local i in the referenced locals list, and no locals in the assigned locals list.

After the lists are generated for the various code blocks, they are provided to the merging mechanism 208 for further processing.

Merging Mechanism

A goal of the merging mechanism 208 is to flow the locals referenced in the various code blocks to other code blocks in the method. As a local is flowed from one code block to another code block, that local is added to the list of referenced locals associated with the other code block. The practical effect of this flowing of the locals is that the lists of referenced locals of the various code blocks are merged. This merging of the lists of referenced locals establishes some continuity of the locals between the various code blocks. It allows a local that is not actually referenced in a code block to be added to the list of referenced locals for that code block; in effect, it enables the local to flow through that code block.

At the end of the merging process, the lists of referenced locals of the various code blocks will have many locals in common. These lists represent the locals that should be loaded into hardware registers prior to executing the code blocks. Because the lists will have many locals in common, many of the same locals will be loaded into registers prior to executing the code blocks. If a local is already in a register prior to loading, it does not need to be loaded. Thus, by establishing continuity among the referenced locals of the various code blocks, many locals will already be in registers so that, in going from code block to code block, few if any locals will actually need to be loaded into registers. Thus, the merging process helps to keep locals in registers across multiple blocks to avoid the loading process as much as possible.

Figure 6:
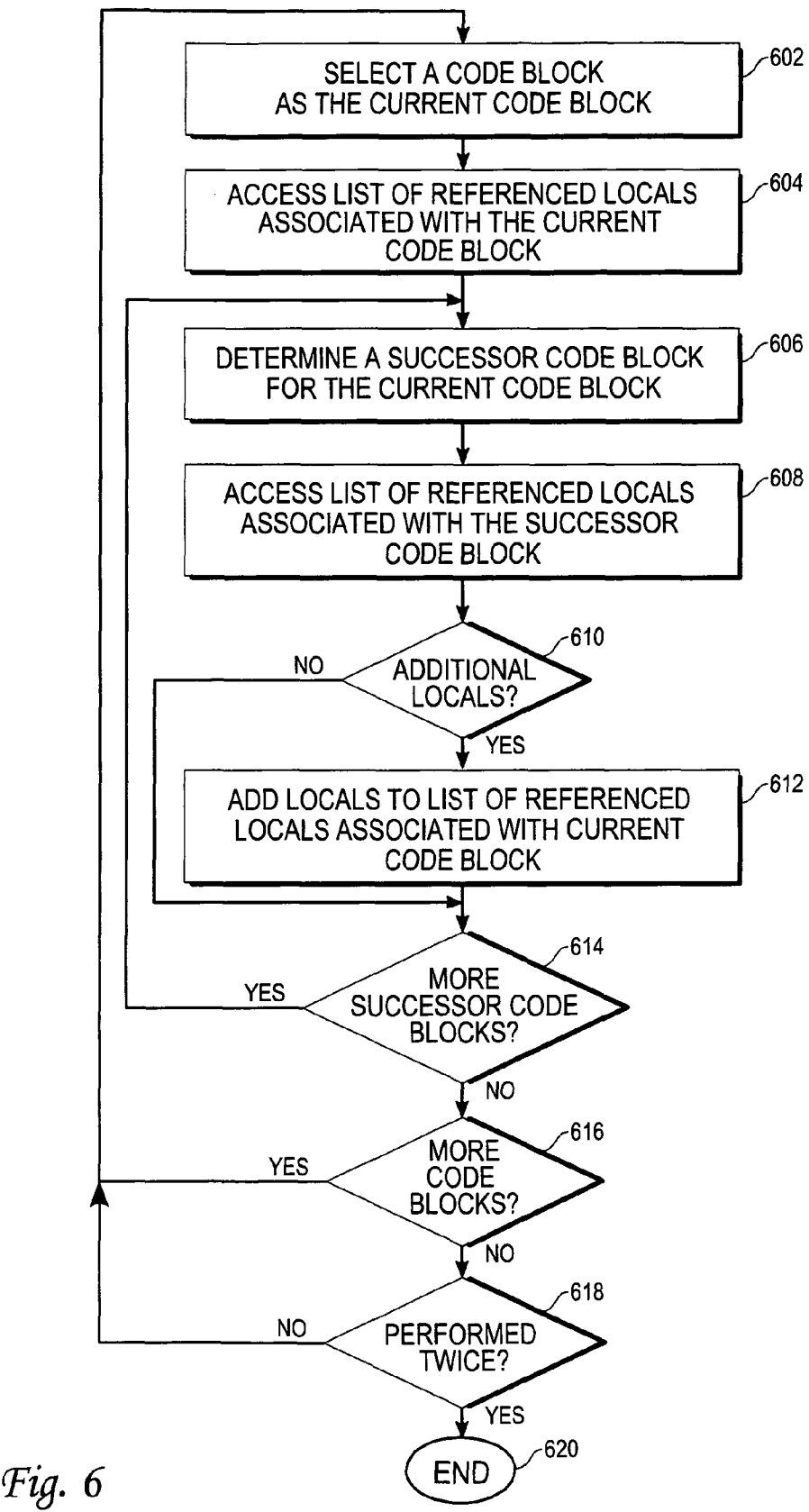
FIG. 6 is a flow diagram that illustrates the manner in which the merging mechanism of FIG. 2 merges a plurality of lists of referenced locals, in accordance with one embodiment of the present invention.

With reference to FIG. 6, there is shown a flow diagram that illustrates the merging process performed by the merging mechanism 208, in accordance with one embodiment of the present invention. As shown, the merging mechanism 208 begins operation by selecting (block 602) one of the code blocks of a method to be the current code block. In one embodiment, the merging mechanism 208 starts with the last sequential code block. If the method of FIG. 3 were processed, for example, the last sequential code block would be code block L1.

After a code block is selected as the current code block, the merging mechanism 208 accesses (block 604) the list of referenced locals associated with the current code block. In addition, the merging mechanism 208 determines (block 606) a successor code block to which the current code block branches or falls through, and accesses (block 608) the list of referenced locals associated with that successor code block. Once it has both lists, the merging mechanism 208 compares the lists (block 610) and determines whether the list associated with the successor code block contains any additional locals that are not in the list associated with the current code block. If the list associated with the successor code block does contain one or more additional locals that are not in the list associated with the current code block, then the one or more additional locals may be added (block 612) to the list of referenced locals associated with the current code block. In one embodiment, the default is to add the additional locals to the list associated with the current code block; however, some conditions may dictate that one or more of the additional locals not be added to the list.

In determining whether to add an additional local to the list of referenced locals associated with the current code block, the merging mechanism 208, in one embodiment, checks for several conditions. A first condition is whether the additional local is in the list of assigned locals associated with the current code block. If the additional local is in the list of assigned locals associated with the current code block, and if the assignment of a value to the additional local in the current code block occurs before the current code block branches to the successor code block, then the additional local from the successor code block is not added to the list of referenced locals associated with the current code block. Since the current code block will assign a value to the additional local before it branches to the successor code block (where the additional local is actually referenced), there is no point in preloading the additional local into a register prior to executing the current code block.

Another condition that the merging mechanism 208 checks for is whether a method invocation is encountered in the current code block before it branches or falls through to the successor code block. If a method invocation is encountered in the current code block before it branches or falls through to the successor code block, then the additional local is not added to the list of referenced locals associated with the current code block. Since, in one embodiment, a method invocation causes all register values to be lost, there is no point in preloading the additional local into a register before executing the current code block.

Yet another condition that the merging mechanism 208 checks for is whether an instruction that can cause a garbage collection operation to be performed is encountered in the current code block before it branches or falls through to the successor code block. If an instruction that can cause a garbage collection operation to be performed is encountered in the current code block before it branches or falls through to the successor code block, and if the additional local is a pointer local, then the additional local is not added to the list of referenced locals associated with the current code block. Since the additional local may be lost as a result of a garbage collection operation, there is little point in preloading it into a register before executing the current code block. These and other conditions may prevent an additional local from being added to the list of referenced locals associated with the current code block.

After the additional locals are added (or not added) to the list of referenced locals associated with the current code block, the merging mechanism 208 determines (block 614) whether the current code block has more successor code blocks. If so, the merging mechanism 208 loops back to block 606 to process another successor code block. If not, it proceeds to determine (block 616) whether there are more code blocks that have not been selected as the current code block and hence need to be processed. If so, the merging mechanism 208 loops back to block 602 to select another code block as the current code block. If not, it proceeds to block 618. In one embodiment, to fully merge all of the lists of referenced locals, the merging mechanism 208 processes each code block twice (note: processing each code block twice is sufficient if the method is well structured, that is, the method has no branches from outside of a loop branch into the middle of the loop; if the method is not well structured, even a second pass may not fully merge all of the lists of referenced locals). Thus, in block 618, the merging mechanism 208 determines whether it has processed each code block two times. If it has not, it loops back to block 602 to process each code block one more time. If it has processed each code block twice, then it ends (block 620) the merging process. At the end of this process, each code block will have an updated list of referenced locals associated therewith. Note: in one embodiment, locals are not flowed into exception handlers (because they can be transitioned into from multiple code blocks and even from other methods); thus, if a code block is part of an exception handler, that code block ignored in the merging process.

To illustrate how this process may be applied to an actual method with a plurality of code blocks, reference will be made to the sample code and the sample table shown in FIGS. 3 and 5, respectively. With this set of code, the merging mechanism 208 would begin processing with code block L1, the last code block in the sequence of code and the last code block in the table. As shown in the table of FIG. 5, code block L1 (the current code block) has local i in its list of referenced locals. It has code block L2 as its lone successor code block, and code block L2 (the successor code block) has local y in its list of referenced locals. Upon comparing the two lists of referenced locals, the merging mechanism 208 finds that local y is in the list of referenced locals for code block L2 but not in the list of referenced locals for code block L1. Thus, local y is a candidate to be added to the list of referenced locals for code block L1. In the current example, local y is not in the list of assigned locals for code block L1. In addition, no method invocations and no instructions that can cause a garbage collection to be performed are encountered in code block L1 before branching to code block L2. Thus, there are no conditions that would prevent local y from being added. Hence, in this example, local y is added to the list of referenced locals for code block L1. The result of this addition is shown in FIG. 7A.

Thereafter, the merging mechanism 208 proceeds to process the next code block above the current code block. In this example, that would be code block L3. As shown in the table of FIG. 7A, code block L3 (the current code block) has locals x and i in its list of referenced locals. It has code block L1 as its lone successor code block, and code block L1 (the successor code block) has locals i and y in its list of referenced locals. Upon comparing the two lists of referenced locals, the merging mechanism 208 finds that local y is in the list of referenced locals for code block L1 but not in the list of referenced locals for code block L3. Thus, local y is a candidate to be added to the list of referenced locals for code block L3. In the current example, local y is not in the list of assigned locals for code block L3. In addition, no method invocations and no instructions that can cause a garbage collection to be performed are encountered in code block L3 before branching to code block L1. Thus, there are no conditions that would prevent local y from being added to the list. Hence, in this example, local y is added to the list of referenced locals for code block L3. The result of this addition is shown in FIG. 7B.

Thereafter, the merging mechanism 208 proceeds to process the next code block above the current code block which, in this example, is code block L2. As shown in the table of FIG. 7B, code block L2 (the current code block) has local y in its list of referenced locals. It has code block L3 as its lone successor code block, and code block L3 (the successor code block) has locals x, i, and y in its list of referenced locals. Upon comparing the two lists of referenced locals, the merging mechanism 208 finds that locals x and i are in the list of referenced locals for code block L3 but not in the list of referenced locals for code block L2. Thus, locals x and i are candidates to be added to the list of referenced locals for code block L2. In the current example, locals x and i are not in the list of assigned locals for code block L2. In addition, no method invocations and no instructions that can cause a garbage collection to be performed are encountered in code block L2 before branching to code block L3. Thus, there are no conditions that would prevent locals x and i from being added to the list. Hence, in this example, locals x and i are added to the list of referenced locals for code block L2. The result of this addition is shown in FIG. 7C.

Thereafter, the merging mechanism 208 proceeds to process the next code block above the current code block which, in this example, is code block L0. As shown in the table of FIG. 7C, code block L0 (the current code block) has no locals in its list of referenced locals. It has code block L1 as its lone successor code block, and code block L1 (the successor code block) has locals i and y in its list of referenced locals. Upon comparing the two lists of referenced locals, the merging mechanism 208 finds that locals i and y are in the list of referenced locals for code block L1 but not in the list of referenced locals for code block L0. Thus, locals i and y are candidates to be added to the list of referenced locals for code block L0. In the current example, however, locals i and y are both in the list of assigned locals for code block L0, and the assignment of values to locals i and y occur in code block L0 prior to the branch to code block L1. Thus, locals i and y are not added to the list of referenced locals for code block L0.

FIG. 7C shows the results at the end of the first pass through all of the code blocks. Notice that all of the referenced locals have been flowed through all of the code blocks except for code block L1, which is missing local x. This is a result of making just one pass through the code blocks. If another pass is made (in the manner described above) through all of the code blocks, local x will be pulled into the list of referenced locals for code block L1 (note: this is true if the method is well structured; in the current example, the method is well structured; thus, local x will be pulled into the list of referenced locals for code block L1). The results of the merging process after the second pass are shown in FIG. 7D. After the merged lists of referenced locals are derived, they are passed on to the ordering mechanism 210 for further processing.

Ordering Mechanism

As noted previously, the list of referenced locals associated with a code block serves as a suggestion to the back end 204 as to what locals should be preloaded into hardware registers prior to entering the code block. In one embodiment, the back end 204 determines which hardware register to load a local into based, as least partially, upon the slot in which the local is stored in the list of referenced locals. For example, if a code block has a list of referenced locals that includes x, y, and z, in that order, then the back end 204 may load x, y, and z into registers r6, r7, and r8, respectively. On the other hand, if another code block has the same locals but its list of referenced locals is in the order of y, z, x, then the back end 204 may load y, z, and x into registers r6, r7, and r8, respectively. Thus, as this example shows, the order in which the locals are stored in a list of referenced locals is significant in determining the hardware register into which those locals are loaded.

That being the case, when a plurality of code blocks have common locals in their lists of referenced locals, it is desirable to order the locals in the lists in such a manner that, as much as possible, the common locals are stored in the same slots in each of the lists. This prevents the locals from having to be moved from register to register when execution moves from code block to code block.

To illustrate this point, reference will be made to the example shown in FIG. 7D. As shown in the table of FIG. 7D, code block L1 has the locals i, y, and x, in that order, in its list of referenced locals. Code block L2 has the same locals in its list of referenced locals, but the locals are in the order of y, x, i. Before code block L1 is executed, local i is loaded into a register associated with the first slot (assume r6), local y is loaded into a register associated with the second slot (assume r7), and local x is loaded into a register associated with the third slot (assume r8). When code block L1 branches to code block L2, the same locals are to be preloaded into registers. Because the locals are already loaded into registers, they do not need to be loaded again from memory. However, in the list of referenced locals for code block L2, local y is in the slot associated with register r6, local x is in the slot associated with register r7, and local i is in the slot associated with r8. Thus, before code block L2 is entered, the local y is moved from its current register r7 into register r6, the local x is moved from its current register r8 into register r7, and the local i is moved from its current register r6 into register r8. This movement of locals from register to register is inefficient. To reduce and perhaps even eliminate it, one embodiment of the present invention orders the lists of referenced locals in such a way that common locals are placed in the same slots (as much as possible) in each of the lists.

Figure 8:
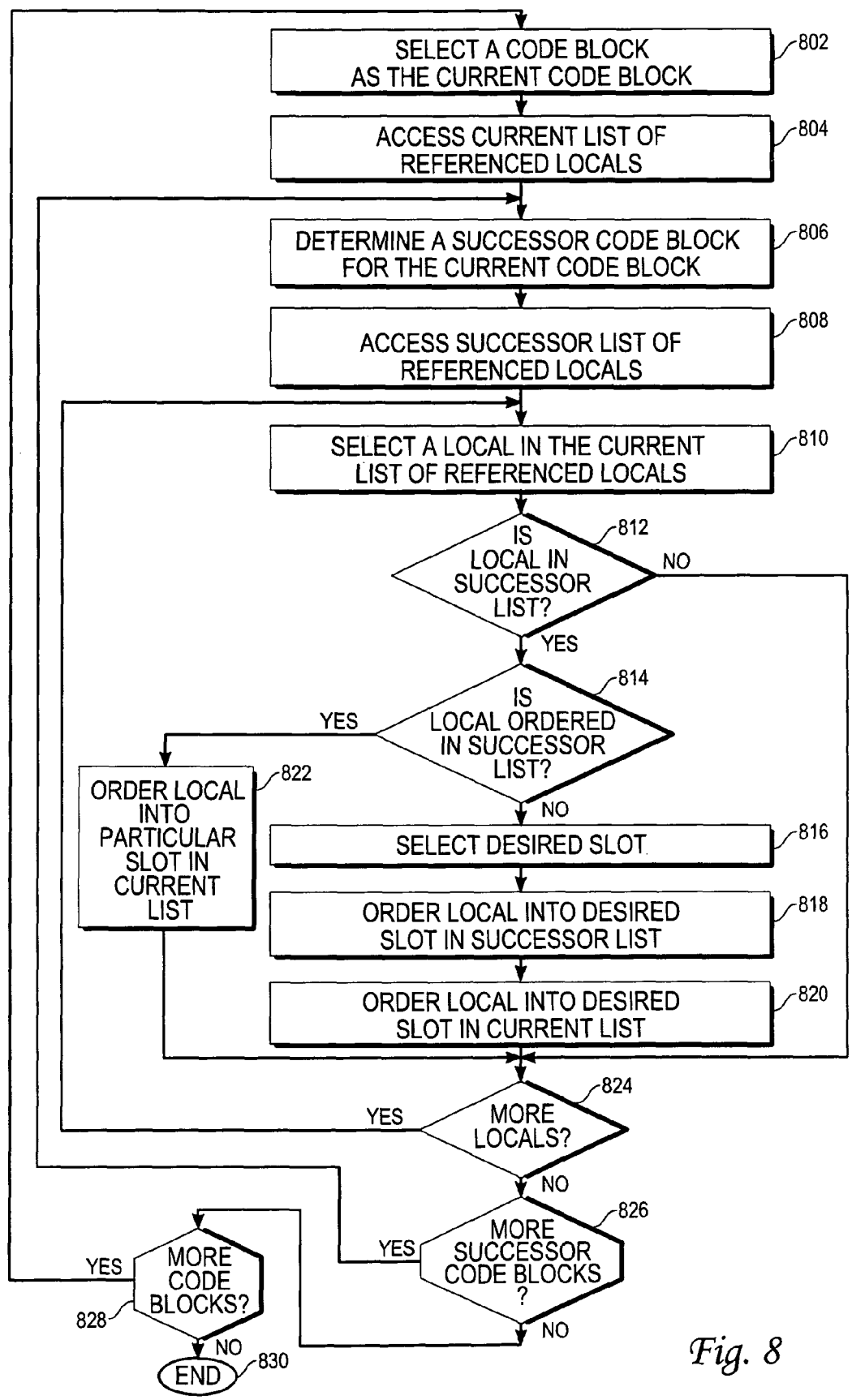
FIG. 8 is a flow diagram that illustrates the manner in which the ordering mechanism of FIG. 2 orders a plurality of lists of referenced locals, in accordance with one embodiment of the present invention.

With reference to FIG. 8, there is shown a flow diagram that illustrates the ordering process performed by the ordering mechanism 210, in accordance with one embodiment of the present invention. As shown, the ordering mechanism 210 begins the ordering process by selecting (block 802) one of the code blocks of a method to be the current code block. In one embodiment, the first code block selected is the last sequential code block of the method (as was the case with the merging process). After the current code block is selected, the list of referenced locals associated with the current code block (referred to as the current list) is accessed (block 804). In addition, a successor code block to which the current code block branches or falls through is determined (block 806), and the list of referenced locals associated with the successor code block (referred to as the successor list) is accessed (block 808).

After it has the current list and the successor list, the ordering mechanism 210 selects (block 810) one of the locals in the current list. The ordering mechanism 210 determines (block 812) whether that local is also in the successor list. If it is not, the local is not processed any further, and the ordering mechanism 210 branches to block 824. However, if the local is also in the successor list, the ordering mechanism 210 proceeds to determine (block 814) whether the local has already been ordered into a particular slot in the successor list. If it has, then the ordering mechanism 210 orders (block 822) the local into the same particular slot in the current list (if the local is not already ordered into that particular slot). If the local has not been ordered into a particular slot in the successor list, then the ordering mechanism 210 selects (block 816) a desired slot. In some instances, the local may already be ordered into a certain slot in the current list. In such a case, the ordering mechanism 210 selects that certain slot as the desired slot. If the local is not already ordered into a certain slot in the current list, the ordering mechanism 210 determines which slot or slots are still available (i.e. are still unordered) in both the current list and the successor list, and selects one of those slots. In one embodiment, if multiple slots are available in both lists, the ordering mechanism 210 selects a "best" slot. A method for selecting the best slot will be described in a later section. After a desired slot is selected, the ordering mechanism 210 orders (block 818) the local into the desired slot in the successor list. It also orders the local into the desired slot in the current list (if the local is not already ordered into the desired slot). Thereafter, the ordering mechanism 210 proceeds to block 824.

In block 824, the ordering mechanism 210 determines whether there are more locals in the current list that still need to be processed. If so, it loops back to block 810 to select another local in the current list. If not, the ordering mechanism 210 proceeds to block 826 to determine whether the current code block has more successor code blocks (recall that a code block can have more than one successor code block). If the current code block has more successor code blocks that still need to be processed, the ordering mechanism 210 loops back to block 806 to process another successor code block. If the current code block has no more successor code blocks, then the ordering mechanism 210 proceeds to block 828 to determine whether there are any more code blocks that still have not yet been selected as the current code block. If there are, the ordering mechanism 210 loops back to block 802 to select another code block as the current code block. If all of the code blocks of the method have been processed, then the ordering mechanism 830 ends (block 830) the ordering process.

In one embodiment, after the process shown in FIG. 8 is performed, the ordering mechanism 210 takes one more pass through the code blocks, this time in the forward direction, starting with the first (rather than the last) sequential code block. A goal of this pass is to move any unordered locals to slots that do not conflict with any other locals in successor blocks. In this pass, the ordering mechanism 210 selects a code block to be the current code block, accesses the list of referenced locals associated with the current code block (the current list), determines all of the successor code blocks for the current code block, and accesses the lists of referenced locals associated with the successor code blocks (the successor lists). The ordering mechanism 210 then iterates over each unordered local in the current list. For each unordered local, the ordering mechanism 210 determines whether the unordered local is in a slot that conflicts with any other local in any of the successor lists. If there is a conflict, then the ordering mechanism 210 will move either the unordered local in the current list or the local in the successor list (if it is also unordered) to another slot to remove the conflict. By doing this for each unordered local for each code block, the ordering mechanism 210 further reduces the number of instances in which a register will be spilled as a result of moving from one code block to another code block. A possible result of this process is that a list of referenced locals may have empty slots (e.g. null, null, x). This does not pose a problem.

To illustrate how the ordering process may be applied to an actual method with a plurality of code blocks, reference will be made to the example shown in FIG. 7D. The table of FIG. 7D shows the results of applying the merging process to the code blocks shown in FIG. 3. As can be seen, the lists of referenced locals generated thus far have not been ordered.

To impose order on the lists, the ordering mechanism 210 initially marks each of the locals in each of the lists as unordered (denoted by (u)), as shown in FIG. 9A. Then, the ordering mechanism 210 selects one of the code blocks to process. In one embodiment, the ordering mechanism 210 begins by selecting code block L1, the last sequential code block. As shown in FIG. 9A, code block L1 has one successor code block, L2, and has locals i, y, and x in its list of referenced locals. The ordering mechanism 210 begins processing code block L1 by selecting the first local i, and determining whether this local is in the list of referenced locals for the successor code block L2. In this example, local i is in the list of referenced locals for successor code block L2; thus, the ordering mechanism 210 proceeds to determine whether the local i has been ordered into a particular slot in the list of referenced locals for code block L2. In this example, it has not; thus, the ordering mechanism 210 proceeds to select a desired slot. Thus far, none of the slots in either list has been ordered; hence, all of the slots are still available. In the current example, it will be assumed that the ordering mechanism 210 selects the first slot as the desired slot. In such a case, the ordering mechanism 210 orders the local i into the first slot of the list of referenced locals for the successor code block L2, and orders the local i into the first slot of the list of referenced locals for the code block L1. The local i is now marked as ordered (denoted by (o)) in both lists, as shown in FIG. 9B.

The same process is carried out for locals y and x. By the time all of the locals in the list of referenced locals for code block L1 have been processed, the results will be that shown in FIG. 9B, where local i has been ordered into the first slot of both lists, local y has been ordered into the second slot of both lists, and local x has been ordered into the third slot of both lists.

Thereafter, the ordering mechanism 210 proceeds to process the next code block above code block L1, which in this example, is code block L3. As shown in FIG. 9B, code block L3 has one successor block, L1, and has locals x, i, and y. To process code block L3, the ordering mechanism 210 selects the first local in the list of referenced locals for code block L3, which in this example, is local x. The ordering mechanism 210 determines whether this local is in the list of referenced locals for the successor code block L1. In this example, local x is in the list of referenced locals for successor code block L1; thus, the ordering mechanism 210 proceeds to determine whether the local x has been ordered into a particular slot in the list of referenced locals for code block L1. In this example, local x has been ordered into the third slot of the list of referenced locals for code block L1; thus, the ordering mechanism 210 proceeds to order local x into the third slot of the list of referenced locals for code block L3. The same process is carried out for locals i and y. By the time all of the locals in the list of referenced locals for code block L3 have been processed, the results will be that shown in FIG. 9C, where local i has been ordered into the first slot of the list of referenced locals for code block L3, local y has been ordered into the second slot, and local x has been ordered into the third slot.

Thereafter, the ordering mechanism 210 proceeds to process the next code block above code block L3, which in this example, is code block L2. As shown in FIG. 9C, code block L2 has one successor block, L3, and has locals i, y, and x. As a result of processing code block L1 earlier, all of the locals in the list of referenced locals for code block L2 have already been ordered; thus, no further ordering is necessary at this point. Hence, the ordering mechanism 210 proceeds to process code block L0, the next code block above code block L2. For code block L0, there are no locals in the list of referenced locals; thus, no ordering is needed. Since L0 is the last of the code blocks, ordering of the locals is complete. Notice that at the end of the ordering process, all of the locals are in the same slots in all of the lists. Thus, not only will the locals flow from code block to code block, they will also likely be loaded into and stay in the same registers across the code blocks.

In the above example, each code block had the same set of referenced locals (albeit the locals were originally out of order). This made ordering the locals relatively simple. In some situations, the various code blocks may each have a slightly different set of referenced locals, and the code blocks may be situated such that there are code blocks in the middle of the set of code blocks that do not include one or more locals as a referenced local. In such a case, ordering the locals consistently throughout the various lists may be more difficult.

To illustrate this point, suppose that a set of code blocks has the lists of referenced locals shown in the table of FIG. 10A. Suppose further that the maximum number of locals allowed in each list of referenced locals is two. For such a set of code blocks, the ordering mechanism 210 may process the code blocks and the lists as follows. Initially, the ordering mechanism 210 selects code block L1 to process. As shown, code block L2 is the lone successor block to code block L1, and the lists of referenced locals for code blocks L1 and L2 have the local w in common; thus, the ordering mechanism 210 imposes an order on the local w. Currently, the local w has not been ordered into any particular slot in the successor block L2; thus, the ordering mechanism 210 can choose a desired slot for the local w. In the example, both slots are open in both lists; thus, the ordering mechanism 210 can choose either slot. For purposes of illustration, it will be assumed that the ordering mechanism 210 selects the first slot. Thus, the local w is ordered into the first slot of the list of referenced locals for successor code block L2, and into the first slot of the list of referenced locals for code block L1, as shown in FIG. 10B.

Thereafter, the ordering mechanism 210 proceeds to process code block L4. As shown in FIG. 10B, code block L1 is the lone successor block to code block L4, and the lists of referenced locals for code blocks L4 and L1 have no locals in common. Thus, none of the locals in the list of referenced locals for code block L4 are ordered.

Thereafter, the ordering mechanism 210 proceeds to process code block L3. As shown in FIG. 10B, code block L4 is the lone successor block to code block L3, and the lists of referenced locals for code blocks L4 and L3 have the local y in common; thus, the ordering mechanism 210 imposes an order on the local y. Currently, the local y has not been ordered into any particular slot in the successor block L4; thus, the ordering mechanism 210 can choose a desired slot for the local y. In the example, both slots are open in both lists; thus, the ordering mechanism 210 can choose either slot. Given the information that it currently has, the ordering mechanism 210 has no reason to choose one slot over the other. Thus, it will be assumed for the sake of illustration that the ordering mechanism 210 chooses the first slot. As a result, the local y is ordered into the first slot of the list of referenced locals for successor code block L4, and into the first slot of the list of referenced locals for code block L3, as shown in FIG. 10C.

Thereafter, the ordering mechanism 210 proceeds to process code block L2. As shown in FIG. 10C, code block L3 is the lone successor block to code block L2, and the lists of referenced locals for code blocks L3 and L2 have the local w in common; thus, the ordering mechanism 210 wants to impose an order on the local w. Currently, the local w has not been ordered into any particular slot in the successor block L3; thus, the ordering mechanism 210 can choose a desired slot for the local w. In the current example, the ordering mechanism 210 would like to order the local w into the first slot, since this is the slot in which the local w has been ordered in the list of referenced locals for code block L2. However, because the first slot in the list of referenced locals for successor code block L3 has already be ordered with local y, the ordering mechanism 210 cannot order the local w into this slot. Thus, the local w remains unordered in the list of referenced locals for code block L3.

The problem in this case really arose during the processing of code block L3. If the ordering mechanism 210 had had more information at the time it chose a slot for the local y, it would have chosen the second slot instead of the first slot. If it had done that, then the ordering mechanism 210 would have been able to order, at a later time, the local w into the first slot of the list of referenced locals for code block L3.

In one embodiment, to overcome this problem, the ordering mechanism 210 gathers and considers more information before making a choice as to which slot to order a local into. More specifically, in addition to looking at just the list of referenced locals associated with the current code block and the list of referenced locals associated with the immediate successor code block, the ordering mechanism 210 also takes into account the lists of referenced locals associated with other code blocks. These other code blocks may include other successor code blocks (recall that a code block may have multiple successor code blocks), as well as backwards branch target code blocks. A backwards branch target code block is a code block in a loop that is the target of a backwards branch. It is the code block that starts the loop, and it is the code block that is branched back to to continue the loop. In the example shown in FIG. 10C, code block L2 is a backwards branch target code block of the loop. Notice how the code blocks flow from code block L2 to L3 to L4 to L1 and then back to L2. It has been observed that the ordering of the locals in the list of referenced locals associated with a backwards branch target code block has an impact on the ordering of the locals in the lists of referenced locals associated with the other code blocks in the loop. Thus, in one embodiment, the list of referenced locals for a backwards branch target code block is taken into account in selecting a slot for a local. Note: the list of referenced locals for the backwards branch target code block is taken into account if the current code block is within the loop established by the backwards branch target code block. If the current code block is outside of the loop, the list of referenced locals for the backwards branch target code block is not taken into account in selecting a slot. Thus, in the example of FIG. 10C, backwards branch target code block L2 would be taken into account in ordering the lists of referenced locals for code blocks L1, L2, L3, and L4 (within the loop), but not for code block L0 (outside the loop). In one embodiment, it is assumed that all of the code blocks between the backwards branch target code block and the code block that branches to the backwards branch target code block are within the loop. This assumption is true if a method is well structured. If the method is not well structured, this assumption might not hold true.

In one embodiment, in selecting a slot for a local, the ordering mechanism 210 determines a desirability factor for each candidate slot. A more favorable or less favorable desirability factor may be assigned to a slot based upon certain conditions. For example, if another local has already been ordered into a slot in another list (e.g. the list of referenced locals for another successor code block or the list of referenced locals for the backwards branch target code block), then that slot is given a less favorable desirability factor. On the other hand, if a slot has already been ordered with the same local in another list (e.g. the list of referenced locals for another successor code block or the list of referenced locals for the backwards branch target code block), then it is given a more favorable desirability factor. After a desirability factor is determined for each candidate slot, the ordering mechanism 210 selects the slot with the most favorable desirability factor. This slot is then used as the desired slot.

To illustrate how this concept can be used to solve the problem illustrated above, reference will be made to the same example (FIG. 10A). Initially, the ordering mechanism 210 selects code block L1 to process. As shown, code block L2 is the lone successor block to code block L1, and the lists of referenced locals for code blocks L1 and L2 have the local w in common; thus, the ordering mechanism 210 imposes an order on the local w. Currently, the local w has not been ordered into any particular slot in the successor block L2; thus, the ordering mechanism 210 can choose a desired slot for the local w. In the example, both slots are open in both lists; thus, the ordering mechanism 210 can choose either slot. In choosing a slot, the ordering mechanism 210 determines a desirability factor for each slot. Given the lists of referenced locals for code block L1 and successor code block L2, there is nothing that indicates that either slot is better than the other. Thus, both slots have the same desirability factor. In addition to considering the list of referenced locals for the immediate successor code block L2, the ordering mechanism 210 also looks at the list of referenced locals for any other successor code blocks (but code block L1 has no other successor code blocks) and the list of referenced locals for the backwards branch target code block L2, which just happens to be the same code block as the immediate successor code block L2. Again, both slots have the same desirability factor; thus, either slot can be chosen. For the sake of illustration, it will be assumed that the ordering mechanism 210 selects the first slot. Thus, the local w is ordered into the first slot of the list of referenced locals for successor code block L2, and into the first slot of the list of referenced locals for code block L1, as shown in FIG. 11A.

Thereafter, the ordering mechanism 210 proceeds to process code block L4. As shown in FIG. 11A, code block L1 is the lone successor block to code block L4, and the lists of referenced locals for code blocks L1 and L2 have no locals in common. Thus, none of the locals in the list of referenced locals for code block L4 are ordered.

Thereafter, the ordering mechanism 210 proceeds to process code block L3. As shown in FIG. 11A, code block L4 is the lone successor block to code block L3, and the lists of referenced locals for code blocks L4 and L3 have the local y in common; thus, the ordering mechanism 210 imposes an order on the local y. Currently, the local y has not been ordered into any particular slot in the list of referenced locals for successor code block L4; thus, the ordering mechanism 210 can choose a desired slot for the local y. In the current example, both slots are open in both the list of referenced locals for code block L3 and the list of referenced locals for successor code block L4; thus, at this point, both slots have the same desirability factor. In addition to considering the list of referenced locals for the immediate successor code block L4, the ordering mechanism 210 also looks at the list of referenced locals for any other successor code blocks (but code block L3 has no other successor code blocks) and the list of referenced locals for the backwards branch target code block L2. In the list of referenced locals for code block L2, the first slot has already been ordered with the local w, while the second slot is still unordered. Thus, the first slot is given a less favorable desirability factor. That being the case, the ordering mechanism 210 selects the second slot for the local y. As a result, the local y is ordered into the second slot of the list of referenced locals for successor code block L4, and into the second slot of the list of referenced locals for code block L3, as shown in FIG. 11B.

Thereafter, the ordering mechanism 210 proceeds to process code block L2. As shown in FIG. 11B, code block L3 is the lone successor block to code block L2, and the lists of referenced locals for code blocks L3 and L2 have the local w in common; thus, the ordering mechanism 210 imposes an order on the local w. Currently, the local w has not been ordered into any particular slot in the successor block L3; thus, the ordering mechanism 210 can choose a desired slot for the local w. In the current example, the local w has already been ordered into the first slot of the list of referenced locals associated with code block L2. Thus, the ordering mechanism 210 orders the local w into the first slot of the list of referenced locals for code block L3. This is shown in FIG. 11C.

Thereafter, the ordering mechanism 210 proceeds to process code block L0, but since code block L0 has no locals in its list of referenced locals, there is nothing to order. Thus, the ordering of the locals is complete. Notice from the table of FIG. 11C that, this time, because the list of referenced locals of the backwards branch target code block L2 was taken into account in choosing a slot for local y, all of the local y's in the various lists are in the second slot. Likewise, all of the local w's are in the first slot of the various lists. Ordered in this manner, the locals will flow more continuously and smoothly from code block to code block.

Returning to FIG. 2, after the front end 202 generates the IR for the method, which includes the lists of locals for each code block, the IR is provided to the back end 204 for further processing.

Back End

Given the IR, the back end 204 is able to emit compiled or native code that implements the logic of the code blocks. Given the information contained in the lists of locals, the back end 204 is also able to emit code that, when executed, will preload the proper locals into registers prior to executing the code blocks, and will maintain the locals in the same registers across multiple code blocks. Thus, this embodiment of the present invention enables a compiler to emit more optimized native code that preloads and keeps locals in the same registers as much as possible across multiple code blocks.

Hardware Overview

Figure 12:
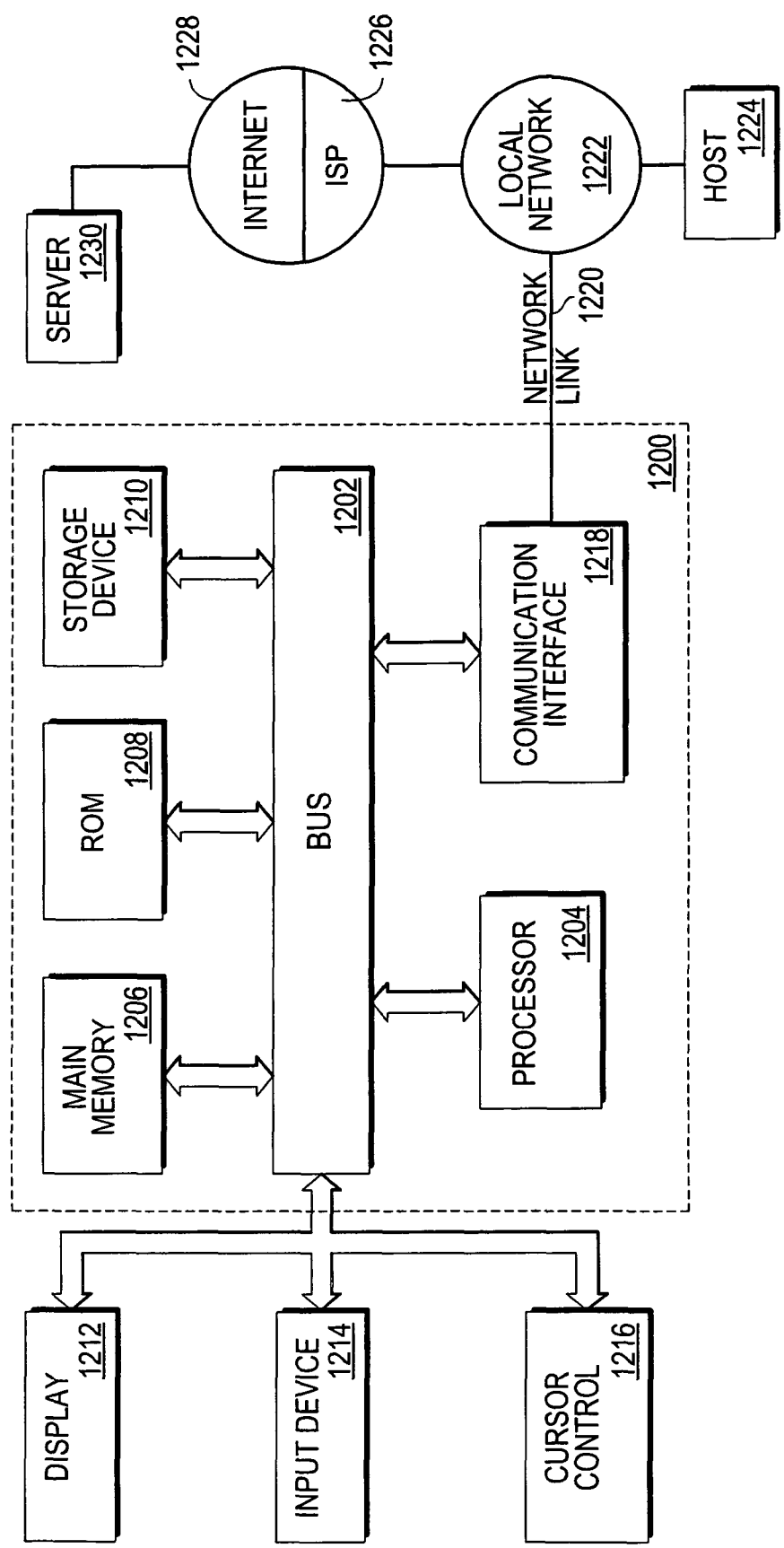
FIG. 12 is a block diagram of a general purpose computer system in which one embodiment of the present invention may be implemented.

In one embodiment, the JVM 104, interpreter 108, JIT compiler 110, front end 202, back end 204, conversion mechanism 206, merging mechanism 208, and ordering mechanism 210 may be implemented using hardware logic components, or may take the form of sets of instructions that are executed by one or more processors. If they take the form of sets of instructions, FIG. 12 shows a block diagram of a computer system 1200 upon which these sets of instructions may be executed. Computer system 1200 includes a bus 1202 for facilitating information exchange, and one or more processors 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions by processor 1204. Computer system 1200 may further include a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212 for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

In computer system 1200, bus 1202 may be any mechanism and/or medium that enables information, signals, data, etc., to be exchanged between the various components. For example, bus 1202 may be a set of conductors that carries electrical signals. Bus 1202 may also be a wireless medium (e.g. air) that carries wireless signals between one or more of the components. Bus 1202 may further be a network connection that connects one or more of the components. Any mechanism and/or medium that enables information, signals, data, etc., to be exchanged between the various components may be used as bus 1202.

Bus 1202 may also be a combination of these mechanisms/media. For example, processor 1204 may communicate with storage device 1210 wirelessly. In such a case, the bus 1202, from the standpoint of processor 1204 and storage device 1210, would be a wireless medium, such as air. Further, processor 1204 may communicate with ROM 1208 capacitively. Further, processor 1204 may communicate with main memory 1206 via a network connection. In this case, the bus 1202 would be the network connection. Further, processor 1204 may communicate with display 1212 via a set of conductors. In this instance, the bus 1202 would be the set of conductors. Thus, depending upon how the various components communicate with each other, bus 1202 may take on different forms. Bus 1202, as shown in FIG. 12, functionally represents all of the mechanisms and/or media that enable information, signals, data, etc., to be exchanged between the various components.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any tangible medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other tangible medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

At this point, it should be noted that although the invention has been described with reference to a specific embodiment, it should not be construed to be so limited. Various modifications may be made by those of ordinary skill in the art with the benefit of this disclosure without departing from the spirit of the invention. For example, the flowing and ordering processes have been described with reference to just locals. However, it should be noted that these processes may also be applied to constants to keep constants in registers across multiple code blocks. For constants, these processes would work in generally the same manner except that, in generating and merging lists of locals, it would not be necessary to check for previous assignments (since values are not assigned to constants) or to check for previous instructions that can cause a garbage collection operation to be performed (since constants are not used as references to objects). In general, the concepts taught herein may be applied not just to locals but also to constants and perhaps even other entities. Thus, the invention should not be limited by the specific embodiments used to illustrate it but only by the scope of the issued claims and the equivalents thereof.

What is claimed is:

1. A machine readable medium comprising instructions, which when executed by one or more processors, cause the one or more processors to perform the following:
   (a) selecting one of a plurality of code blocks to be a current code block;
   (b) accessing a current list of local variables, wherein the current list is associated with the current code block;
   (c) determining a successor code block for the current code block, wherein the current code block falls through or branches to the successor code block;
   (d) accessing a successor list of local variables, wherein the successor list is associated with the successor code block;
   (e) selecting one of the local variables in the current list;
   (f) determining whether the selected local variable is also in the successor list;
   (g) determining whether the selected local variable has been ordered into a particular slot in the successor list when the selected local variable is in the successor list;
   (h) selecting a desired slot, when the selected local variable has not been ordered into a particular slot in the successor list;
   (i) ordering the selected local variable into the desired slot in the successor list; and
   (j) ordering the selected local variable into the same desired slot in the current list, when the selected local variable has not already been ordered into the desired slot in the current list.

2. The machine readable medium of claim 1, further comprising instructions for causing one or more processors to perform the following:
   (k) when the selected local variable has been ordered into a particular slot in the successor list, ordering the selected local variable into the same particular slot in the current list, when the selected local variable has not already been ordered into the particular slot in the current list.

3. The machine readable medium of claim 2, further comprising instructions for causing one or more processors to perform the following:
   (l) selecting another local variable in the current list to be the selected local variable; and
   (m) repeating (f) through (l) until each of the local variables in the current list has been selected.

4. The machine readable medium of claim 3, further comprising instructions for causing one or more processors to perform the following:
   (n) selecting another one of the plurality of code blocks to be the current code block; and
   (o) repeating (b) through (n) until each of the code blocks in the plurality of code blocks has been selected.

5. The machine readable medium of claim 1, wherein selecting a desired slot comprises:
   determining whether the selected local variable has been ordered into a certain slot in the current list; and
   when the selected local variable has been ordered into a certain slot in the current list, selecting the certain slot as the desired slot.

6. The machine readable medium of claim 1, wherein selecting a desired slot comprises:
   determining a set of mutually unordered slots, wherein the set of mutually unordered slots comprises slots that are currently unordered in both the current list and the successor list; and
   selecting one of the mutually unordered slots as the desired slot.

7. The machine readable medium of claim 6, wherein the current code block is part of a loop, and wherein selecting one of the mutually unordered slots as the desired slot comprises:
   accessing a target list of local variables, wherein the target list is associated with a code block that is a backwards branch target in the loop; and
   determining whether any of the mutually unordered slots have been ordered in the target list with another local variable.

8. The machine readable medium of claim 6, wherein the current code block is part of a loop, and wherein selecting one of the mutually unordered slots as the desired slot comprises:
   (p) accessing a target list of local variables, wherein the target list is associated with a code block that is a backwards branch target in the loop;
   (q) selecting one of the mutually unordered slots as a current unordered slot;
   (r) determining whether the current unordered slot has been ordered in the target list with another local variable;
   (s) assigning a desirability factor to the current unordered slot, wherein a less favorable desirability factor is assigned to the current unordered slot when the current unordered slot has been ordered in the target list with another local variable;
   (t) selecting another of the mutually unordered slots as the current unordered slot;
   (u) repeating (r) through (t) until all of the mutually unordered slots have been selected; and
   (v) selecting a mutually unordered slot with the best desirability factor as the desired slot.

9. The machine readable medium of claim 6, wherein the current code block is part of a loop, and wherein selecting one of the mutually unordered slots as the desired slot comprises:
   accessing a target list of local variables, wherein the target list is associated with a code block that is a backwards branch target in the loop; and
   determining whether any of the mutually unordered slots have been ordered in the target list with the selected local variable.

10. The machine readable medium of claim 6, wherein the current code block is part of a loop, and wherein selecting one of the mutually unordered slots as the desired slot comprises:
    (p) accessing a target list of local variables, wherein the target list is associated with a code block that is a backwards branch target in the loop;
    (q) selecting one of the mutually unordered slots as a current unordered slot;
    (r) determining whether the current unordered slot has been ordered in the target list with the selected local variable;
    (s) assigning a desirability factor to the current unordered slot, wherein a more favorable desirability factor is assigned to the current unordered slot when the current unordered slot has been ordered in the target list with the selected local variable;
    (t) selecting another of the mutually unordered slots as the current unordered slot;
    (u) repeating (r) through (t) until all of the mutually unordered slots have been selected; and (v) selecting a mutually unordered slot with the best desirability factor as the desired slot.

11. The machine readable medium of claim 6, wherein the current code block has a second successor code block, and wherein selecting one of the mutually unordered slots as the desired slot comprises:

accessing a second successor list of local variables, wherein the second successor list is associated with the second successor code block; and determining whether any of the mutually unordered slots have been ordered in the second successor list with another local variable.

12. The machine readable medium of claim 6, wherein the current code block has a second successor code block, and wherein selecting one of the mutually unordered slots as the desired slot comprises:

accessing a second successor list of local variables, wherein the second successor list is associated with the second successor code block; and determining whether any of the mutually unordered slots have been ordered in the second successor list with the selected local variable.

\* \* \* \* \*